US009022765B2

(12) United States Patent
Nagel et al.

(10) Patent No.: US 9,022,765 B2
(45) Date of Patent: May 5, 2015

(54) VIBRATING MACHINE FOR PRODUCING MOLDED BODIES BY MEANS OF COMPACTING

(75) Inventors: Hardy Nagel, Bruhl (DE); Wilfried Schumacher, Elsdorf (DE); Monique Schmitt, Cologne (DE)

(73) Assignee: Outotec Oyj, Espoo (FI)

( * ) Notice: Subject to any disclaimer, the term of this patent is extended or adjusted under 35 U.S.C. 154(b) by 171 days.

(21) Appl. No.: 13/640,095

(22) PCT Filed: Apr. 6, 2011

(86) PCT No.: PCT/EP2011/001691
§ 371 (c)(1),
(2), (4) Date: Dec. 17, 2012

(87) PCT Pub. No.: WO2011/124362
PCT Pub. Date: Oct. 13, 2011

(65) Prior Publication Data

US 2013/0129855 A1 May 23, 2013

(30) Foreign Application Priority Data

Apr. 9, 2010 (DE) ......................... 10 2010 014 344

(51) Int. Cl.
*B29C 43/04* (2006.01)
*C25C 3/12* (2006.01)
*B22C 15/10* (2006.01)
*B30B 11/02* (2006.01)

(52) U.S. Cl.
CPC ................. *C25C 3/125* (2013.01); *B22C 15/10* (2013.01); *B30B 11/022* (2013.01)

(58) Field of Classification Search
CPC ...... B30B 11/02; B30B 11/022; B22C 15/10; C25C 3/125; B28B 3/022
USPC ......... 425/117, 253, 260, 413, 421, 424, 432, 425/439, 448, 452; 249/137
See application file for complete search history.

(56) References Cited

U.S. PATENT DOCUMENTS 2,167,386 A * 7/1939 Kinnard ........................ 425/267
2,767,447 A 10/1956 Buehrer
4,710,115 A * 12/1987 Tucker et al. ................ 425/117

FOREIGN PATENT DOCUMENTS

CN 2785823 Y 6/2006
CN 101200089 A 6/2008

(Continued)

OTHER PUBLICATIONS

Barry J. Welch of Minerals, Metals & Materials Society, on the occasion of the 127th TMS Annual Meeting, San Antonio, Texas held on Feb 15, to 19, 1998, p. 1-4.

(Continued)

*Primary Examiner* — Joseph S Del Sole
*Assistant Examiner* — Thukhanh T Nguyen
(74) *Attorney, Agent, or Firm* — Leydig, Voit & Mayer, Ltd.

(57) ABSTRACT

A vibrating machine for producing a molded body by compacting a granular raw mixture includes an oscillatable vibrating table configured to receive a molding box. A clamping device is produced by at least two clamping closures, each including: a pivot bracket having a lower end being pivotally mounted on the vibrating table and an upper end including a cranking which is directed outward; a double-acting hydraulic pivot cylinder pivotally mounted on the vibrating table; a two-armed rocker arm pivotally connected to the pivot bracket and including an inner part that cooperates with the molding box and an outer part that cooperates with the hydraulic pivot cylinder; and a compression spring disposed between the cranking and the outer part of the rocker arm such that the rocker arm releases from a position closing the respective clamping closure upon a pressure in the hydraulic pivot cylinder being relieved.

9 Claims, 1 Drawing Sheet

(56) References Cited

FOREIGN PATENT DOCUMENTS

| | | | |
|---|---|---|---|
| DE | 1058705 | B | 6/1959 |
| DE | 9406873 | U1 | 6/1994 |
| DE | 4436236 | A1 | 4/1996 |

OTHER PUBLICATIONS

European Patent Office, International Search Report in International Patent Application No. PCT/EP2011/001691 (Jun. 14, 2011).

* cited by examiner

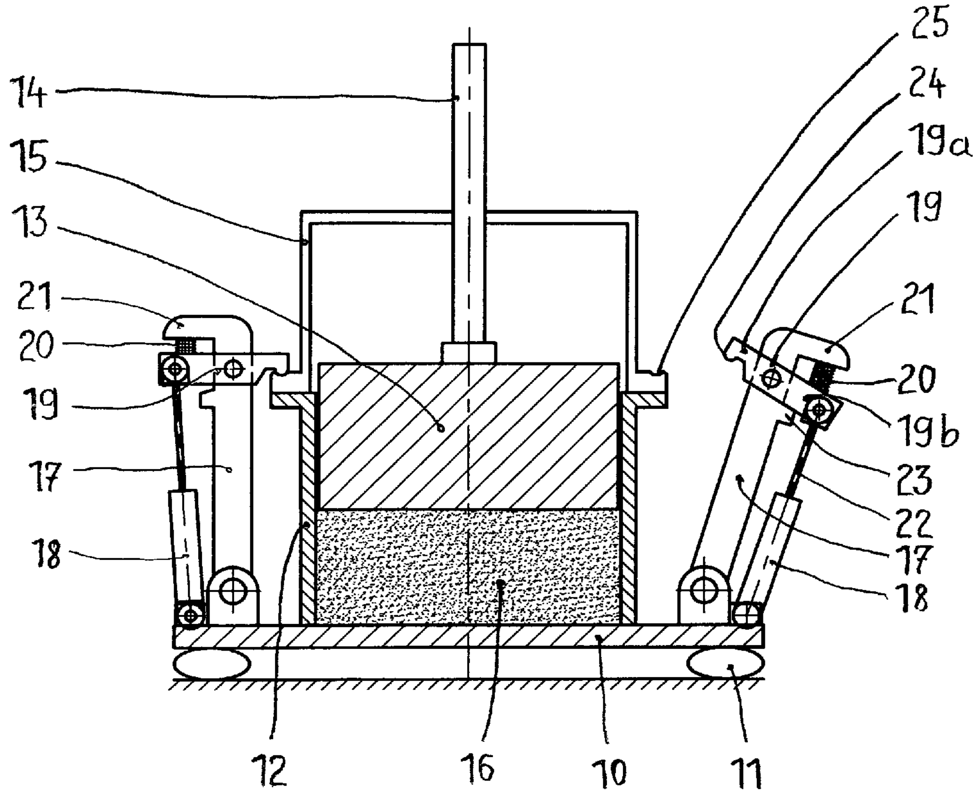
25
24
19a
19
21
20
19b
23
22
17
18
14
15
13
21
20
19
17
18
12
16
10
11

VIBRATING MACHINE FOR PRODUCING MOLDED BODIES BY MEANS OF COMPACTING

CROSS-REFERENCE TO PRIOR APPLICATIONS

This application is a U.S. National Phase application under 35 U.S.C. §371 of International Application No. PCT/EP2011/001691, filed on Apr. 6, 2011, and claims benefit to German Patent Application No. DE 10 2010 014 344.8, filed on Apr. 9, 2010. The International Application was published in English on Oct. 13, 2011, as WO 2011/124362 under PCT Article 21(2).

FIELD

The invention relates to a vibrating machine for producing molded bodies by means of compacting granular raw mixtures in a vibratory manner, in particular for producing anodes and/or cathodes for the electrolytic smelting process to produce aluminum, said vibrating machine having a vibrating table, which is mounted on springs so as to be able to oscillate, onto which a molding box to be filled in each case with a raw mixture charge can be clamped by means of clamping closures.

BACKGROUND

In the case of vibrating machines for producing molded bodies by means of compacting granular raw mixtures in a vibratory manner, a charge of a hot mixture that is produced from petroleum coke and pitch as binding agent poured in the molding box that is to be fastened on the vibrating table is molded by means of vibratory compacting to form an anode block, namely to form the so-called raw green anode which is then baked in a furnace. In this case, the density and height of the block anode to be molded are subject to narrow tolerance limits. Once the molding box has been filled with the raw mixture charge, a cover weight is introduced, as a rule, into the molding box, said cover weight impacting or stamping at a certain impact frequency and impact intensity from above onto the mixture to be compacted. A fixed cover or vacuum cover, which surrounds the cover weight, is placed onto the top side of the filled molding box.

Once the block anode has been molded in the space between the top side of the vibrating table and the bottom side of the cover weight, the system of molding box/cover/cover weight, which is mounted so as to be able to oscillate and is exposed to the vertical oscillations of the vibratory drive, is lifted up from the vibrating table after the drive has been switched off and the pre-molded green block anode is pushed off the top side of the vibrating table to the side.

The fastening or clamping of the system of molding box/cover to the vibrating table, which can exert vertical oscillations at an amplitude of, for example, 4 to 5 mm during the vibrating operation, is exposed to enormous loads. As evidenced by the publication TMS published by Barry J. Welch of the Minerals, Metals & Materials Society, on the occasion of the 127th TMS Annual Meeting, San Antonio, Tex. held 15 on 15th-19th Feb. 1998 a lecture/paper by authors M. Bellstein and M. Spangehl was published, pages 746 and 747 of which showing a vibrating machine, the molding box and cover of which are to be detachably connected to the vibrating table by means of two clamping closures which are arranged at the sides opposite each other outside the molding box, in the following manner:

The known clamping closures are essentially assembled from the four components of pivot bracket, double-acting hydraulic pivot cylinder, two-armed rocker arm and resilient element. The pivot bracket which is pivotally mounted by way of its lower end on the vibrating table stands upright in its closed position. A two-armed rocker arm is pivotally connected to the upper end of the pivot bracket, the inner part of said rocker arm then pressing onto an outer part of the molding box or of the cover placed in position thereon, when the piston rod of the double-acting hydraulic pivot cylinder is extended and presses from underneath against the outer part of the two-armed rocker arm.

In order to hold the clamping closure securely in the closed position thereof, it has been known to allow the inner part of the two-armed rocker arm to lock on the molding box or on the cover thereof. To release the clamping closure it is necessary to move the rocker arm out of its locking position by means of its own retaining mechanism and to pivot the pivot bracket outward away from the molding box at an angle to the vertical, the piston rod of the associated hydraulic pivot cylinder being retracted in the open position of the clamping closure. The rocker arm retaining mechanism has been realized up to now by a long steel spiral tension spring which is arranged between pivot lever and associated hydraulic pivot cylinder, the upper end of which tension spring cooperates with the outer part of the two-armed rocker arm. It has been shown, however, that the oscillations, introduced by means of the vibratory drive and the vibrating table into the system of the vibrating machine that is held so as to be able to oscillate, can pass into the characteristic frequency range of the long tension springs, as a result of which strong oscillations are transmitted to the clamped tension springs and these can impair the service life of the tension springs.

SUMMARY

In an embodiment, the present invention provides a vibrating machine for producing a molded body by compacting a granular raw mixture. A vibrating table is mounted on springs so as to be, able to oscillate. The vibrating table is configured to receive a molding box that can be filled with the raw material. A cover weight is configured to be introduced into the molding box once the molding box has been filled with the raw material. A clamping device is produced by at least two clamping closures configured to clamp the molding box to the vibrating table and disposed at respective sides outside the molding box. Each of the clamping closures includes: a pivot bracket having a lower end and an upper end, the lower end being pivotally mounted on the vibrating table and the upper end including a cranking which is directed outward and faces away from the molding box; a double-acting hydraulic pivot cylinder pivotally mounted on the vibrating table; a two-armed rocker arm pivotally connected, at a spacing below the cranking, to the pivot bracket, the rocker arm including an inner part that cooperates with the molding box and an outer part that cooperates with a piston rod of the hydraulic pivot cylinder; and a compression spring disposed in the spacing between the cranking of the pivot bracket and a top side of the outer part of the rocker arm such that the compression spring releases the rocker arm from a position closing the respective clamping closure upon a pressure in the hydraulic pivot cylinder being relieved.

BRIEF DESCRIPTION OF THE DRAWINGS

The present invention will be described in even greater detail below based on the exemplary FIGURE. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawing which illustrates the following:

The single FIGURE shows a vertical section of the vibrating machine according to an embodiment of the present invention.

DETAILED DESCRIPTION

In an embodiment, the present invention provides a clamping closure for a vibrating machine for clamping the molding box including cover on the vibrating table, it being possible to open and close said clamping closure in an operationally reliable manner and, even at varying excitation frequencies, the components of said clamping closure withstanding the high forces and vibratory stresses introduced by means of the vibrating table.

In the case of the vibrating machine as provided in an embodiment of the invention, the clamping closure has in each case a pivot bracket, which is pivotally mounted by way of the lower end thereof on the vibrating table and has on the upper end thereof a cranking which is directed outward and faces away from the molding box. At a spacing below the cranking of the pivot bracket, a two-armed rocker arm is pivotally connected to the pivot bracket and has rocker arm inner part and rocker arm outer part. In the closed position of the clamping closure, where the pivot bracket stands approximately upright, the rocker arm inner part cooperates with the molding box or with the cover placed in position thereon and depresses it by the piston rod of a double-acting hydraulic pivot cylinder, which is also pivotally mounted on the vibrating table, being extended and pressing from underneath against the rocker arm outer part. A short, compactly designed compression spring is inserted in the space between the cranking of the pivot bracket and the top side of the rocker arm outer part, said compression spring releasing or tipping the rocker arm out of its position closing the clamping closure when the pressure in the hydraulic pivot cylinder is relieved.

The use of the short-design compression spring excludes the risk of the vibrating table oscillation excitation frequencies overlapping in an unwanted manner with the characteristic frequency range of the compression spring, as a result of which the long service life of the compression spring and correct functioning of the opening and closing process of the clamping closure are ensured.

The compression spring of the clamping closure can be a mechanical spring, a spring produced from a material with elasticity of compression or a pneumatic rubber pad spring such as, for example, an air bellows spring with, where applicable, modifiable spring constants. At any rate, such compression springs are able to withstand the high oscillation stresses introduced by means of the vibrating table during the vibrating operation.

An embodiment of the invention provides a further feature, in the case of the clamping closure the pivot bracket, below the joint thereof for the two-armed rocker arm, of a stop member for the rocker arm outer part directed outward in the direction of the pivot bracket cranking for defining the rocker arm pivotability when the clamping closure is opened. The stop member defines the opening angle of the clamping closure in the open position thereof. For the secure clamping of molding box and cover on the vibrating table during the entire vibrating operation, the inner part of the two-armed rocker arm of each clamping closure has at the end thereof, when seen in cross section, a nose-shaped projection which engages in a corresponding recess of the molding box/the cover placed in position thereon in the closed position of the clamping closure.

The drawing shows a vertical section of the vibrating machine according to an embodiment of the invention with two particular clamping closures shown in side view, of which the left-hand clamping closure is shown in the closed position and the right-hand clamping closure is shown in the opened position. The clamping closures are fastened on the vibrating table 10, which is mounted so as to be able to oscillate by means of springs 11, the vibrating oscillating drive connected to the vibrating table 10 with the rotating unbalanced shafts thereof having been left out.

The vibrating machine serves for the molding of anode blocks produced from granular raw mixtures. To this end, a molding box 12, which is open at the bottom and at the top, for example having a rectangular cross section, is placed onto the vibrating table 10, said molding box is filled with a charge of the raw mixture to be compacted, after which a cover weight 13 is introduced into the molding box 12, said cover weight being guided by at least one guide rod 14, which is guided through an opening in a fixed cover 15, which is placed onto the top side of the molding box 12 and closes said molding box from above like a cover.

With the vibrating machine in operation, in the space between the top side of the vibrating table 10 and the bottom side of the cover weight 13, utilizing the impact energy of the cover weight 13 that stamps from above at a certain impact frequency, the raw mixture charge is vibrocompacted to form the anode block 16, which has reached its particular density and height dimension after a certain period of vibration, after which the vibrating operation is switched off, molding box 12, cover 15 and cover weight 13 are removed upward and the anode block 16 is pushed off the top side of the vibrating table 10 to the side.

The at least two clamping closures, which are arranged opposite each other at the sides outside the molding box, are in each case essentially assembled from the four components of pivot bracket 17, double-acting hydraulic pivot cylinder 18, two-armed rocker arm 19 and compression spring 20. The pivot bracket 17 is pivotally mounted by way of the lower end thereof on the vibrating table 10 and in the closed position of the clamping closure it stands approximately upright (on the left-hand side of the molding box in the drawing). On the upper end thereof, the pivot bracket 17 has a cranking 21 which faces outward away from the molding box 12. At a spacing below the cranking 21 of the pivot bracket 17, the two-armed rocker arm 19 is connected to the bracket 17 by means of a pin joint, said rocker arm having an inner part 19*a* that cooperates with the outside of the cover 15 placed in position and an outer part 19*b*, with which the piston rod 22 of the hydraulic pivot cylinder 18 cooperates.

The compact compression spring 20 is inserted in the space between the cranking 21 of the pivot bracket 17 and the top side of the outer part 19*b* of the two-armed rocker arm 19, said compression spring detaching the rocker arm 19 from its position closing the clamping closure when the pressure is relieved from the hydraulic pivot cylinder 18 with the retracting of the piston rod 22 (on the right-hand side of 10 the molding box in the drawing).

The vibrating oscillations introduced by means of the vibrating table 10 during the vibrating operation, the amplitudes of which can be within a range of approximately 4 to 5 mm, are absorbed by the clamping closures used as provided in an embodiment of the invention by way of the compression springs 20 thereof without damaging the same.

As can also be seen from the drawing, the pivot bracket 17, below the joint thereof for the two-armed rocker arm 19, has a stop member 23 for the rocker arm outer part 19*b* directed outward in the direction of the pivot bracket cranking 21 for defining the rocker arm pivotability when the clamping closure is opened, demonstrated on the right-hand side of the moulding box 12 in the drawing. It can also be seen that the inner part 19*a* of the two-armed rocker arm 19 has at the end thereof, when seen in cross section, a nose-shaped projection 24 which, in the closed position of the clamping closure, engages in a corresponding recess 25 in the outside of the cover 15 placed in position, thereby strengthening the clamping of the oscillating unit that is subjected to the vibratory movements on the vibrating table during the vibrating operation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The invention claimed is:

1. A vibrating machine for producing a molded body by compacting a granular raw mixture, comprising:
- a vibrating table mounted on springs so as to be oscillatable, the vibrating table being configured to receive a molding box fillable with the raw material;
- a cover weight configured to be introduced into the molding box once the molding box has been filled with the raw material; and
- a clamping device produced by at least two clamping closures configured to clamp the molding box to the vibrating table and disposed at respective sides outside the molding box, each of the clamping closures comprising:
  - a pivot bracket having a lower end and an upper end, the lower end being pivotally mounted on the vibrating table and the upper end including a cranking which is directed outward and faces away from the molding box;
  - a double-acting hydraulic pivot cylinder pivotally mounted on the vibrating table;
  - a two-armed rocker arm pivotally connected, at a spacing below the cranking, to the pivot bracket, the rocker arm including an inner part that cooperates with the molding box and an outer part that cooperates with a piston rod of the hydraulic pivot cylinder; and
  - a compression spring disposed in the spacing between the cranking of the pivot bracket and a top side of the outer part of the rocker arm such that the compression spring releases the rocker arm from a position closing the respective clamping closure upon a pressure in the hydraulic pivot cylinder being relieved.

2. The vibrating machine according to claim 1, wherein the vibrating machine is configured to produce the molded body as at least one of an anode and a cathode usable in an electrolytic smelting process to produce aluminum.

3. The vibrating machine according to claim 1, wherein the molding box includes a cover and the inner part of the rocker arm cooperates with the cover.

4. The vibrating machine according to claim 1, wherein the compression spring is a mechanical spring having a short design.

5. The vibrating machine according to claim 1, wherein the compression spring is produced from a resilient material.

6. The vibrating machine according to claim 1, wherein the compression spring is at least one of a pneumatic rubber pad spring and an air bellows spring.

7. The vibrating machine according to claim 6, wherein the compression spring has modifiable spring constants.

8. The vibrating machine according to claim 1, wherein the pivot bracket includes a stop member disposed below a joint of the pivot bracket with the rocker arm and directed outward in a direction of the cranking so as to define a pivot angle of the rocker arm when the clamping closure is opened.

9. The vibrating machine according to claim 1, wherein an end of the inner part of the rocker arm has a nose-shaped projection configured to engage in a corresponding recess of the molding box or of a cover disposed on the molding box in a closed position of the clamping closure.

* * * * *